US012416199B1

(12) United States Patent
Brous

(10) Patent No.: US 12,416,199 B1
(45) Date of Patent: Sep. 16, 2025

(54) LIFTING PIVOT DOOR

(71) Applicant: Paul Brous, West Palm Beach, FL (US)

(72) Inventor: Paul Brous, West Palm Beach, FL (US)

( * ) Notice: Subject to any disclaimer, the term of this patent is extended or adjusted under 35 U.S.C. 154(b) by 0 days.

(21) Appl. No.: 18/677,515

(22) Filed: May 29, 2024

(51) Int. Cl.
*E06B 7/28* (2006.01)
*E06B 7/22* (2006.01)

(52) U.S. Cl.
CPC . *E06B 7/28* (2013.01); *E06B 7/22* (2013.01)

(58) Field of Classification Search
USPC ................... 49/316–321, 226, 225, 394, 395
See application file for complete search history.

(56) References Cited

U.S. PATENT DOCUMENTS 1,995,858 A * 3/1935 Mearns, Jr. ............... E06B 1/70 49/467
2,348,937 A * 5/1944 Stahl ........................ A47K 3/36 52/800.14
2,766,860 A * 10/1956 Travis ....................... E06B 7/18 49/318
3,126,050 A * 3/1964 Lapof ....................... E06B 7/20 160/40
3,373,529 A * 3/1968 Ingham ..................... E05F 3/00 49/381
3,400,504 A * 9/1968 Neisewander ........ E06B 3/4636 52/143
4,034,524 A * 7/1977 Fromme ................... E06B 7/18 52/143
4,392,329 A * 7/1983 Suzuki .................... E05C 17/32 49/356
5,964,060 A * 10/1999 Furlong .................... E06B 7/21 49/320
6,497,073 B2 * 12/2002 Webb ...................... E06B 7/367 160/40
8,381,445 B2 * 2/2013 Hans ..................... E06B 3/5072 49/316
8,468,746 B2 * 6/2013 Salerno ..................... E06B 7/18 49/316
8,539,717 B2 * 9/2013 Speyer ...................... E06B 7/23 49/318
11,499,366 B1 * 11/2022 Palmer ...................... E06B 1/70

FOREIGN PATENT DOCUMENTS

DE 10164212 A1 * 7/2003 ............... E06B 5/12
WO WO 90/12946 * 4/1989

OTHER PUBLICATIONS

Machine translation of DE-10164212-A1.*

* cited by examiner

*Primary Examiner* — Marcus Menezes
(74) *Attorney, Agent, or Firm* — John C. Smith

(57) ABSTRACT

A lifting pivot door whose pivots are laterally offset from the edge of the door such that no hinges are required to operate the door. Cams operatively connected to the door handle are activated when the door handle is moved between the unlocked and locked positions. In the locked position, the cams press a mull bar in the bottom of the door until it rests on the floor of the entry and prevents access by water and/or pests. The cams also provide upward pressure on the door to lift the door into an upper jamb pocket that prevents wind pressure from forcing the door open. When in the unlocked position, the cams lower the door such that it is no longer held in place by the jamb pocket and simultaneously raises the mull bar such that the door can freely swing open.

1 Claim, 13 Drawing Sheets

LIFTING PIVOT DOOR

BACKGROUND

Technical Field

This invention relates in general to Pivoting Doors. In particular, to exterior 'pivoting' doors offering high resistance to water and air infiltration as opposed to standard pivoting and/or hinged doors used in commercial and residential exterior entries that do not incorporate mechanical lifting devices.

Background of the Invention

Standard pivot door assemblies offer contemporary architectural appeal, rotating on single top and bottom axis spindles, rather than swinging on 'old-school' edge mounted hinges. One unique aspect of pivoting doors is that while in operation one of the door's two vertical ends or edges swings inward and the opposite edge swings outward as the door panel rotates on top and bottom axis points along the horizontal plane of the door face. Often, a pivot doors axis point is not centered in the middle of the door panel but is off-set from center, allowing a greater portion of the overall doors width to rotate around the axis to increase the passage width on one side of the pivot entering or exiting.

Traditional exterior hinged doors swing open and closed attached to one side of a jamb/frame so that when swung and latched into a 'closed' position gasketing-style "weather-stripping" and solid stops at the perimeter edges of the jamb assembly restrain the door panel providing structural resistance against intrusion and helping to prevent air and water infiltration. Hinges fastened to door panel along vertical edge of the jamb add additional strength and security to the assembly together with independent lock(s) installed on the strike edge of the door to hold the door firmly in the opening. The rotation of door panels around a single pivot point becomes problematic when designing for similar restraining features addressing weather phenomena and security. Pivot doors are unique in that placement for structural door stops and gaskets are limited, unlike traditional doors. Structural stops can only be installed partially on the exterior and interior sides of the jamb assembly and not completely on one side since this would obstruct the door panel from pivoting or rotating freely in the opening as it must rotate in both directions simultaneously. This presents some difficulties when trying to prevent water and air infiltration and provide security since, due to rotation, there will always be one portion of the door and jamb-stops exposed to the exterior side compromising the benefit of structural stop placement similar to those in traditional doors.

Standard pivot door manufacturers generally address limiting water and air infiltration at both the bottom and top of the door panels by installing 'brush-style sweeps' or flexible 'rubber-gaskets' at the top and bottom edges to try and seal-out air, water, dirt, dust and insects. Their difficulty being that there are no solid stops at either the bottom or top of the jamb assembly to offer as a solid positive seal to close against since that would obstruct pivot door rotation. To be effective in sealing out water and dust, manufacturers install bottom gaskets to fill gaps between the door and jamb head or bottom flooring that are in contact with the corresponding surfaces. Weather stripping applied at the bottom is in contact with the surface directly below as they swing, whether brick-pavers, tile, wood or other common floor finishes this constant sweeping motion can be abrasive, wearing flexible gaskets down, requiring regular service and replacement. The bottom height of a pivot door is set at a critical elevation so that it can pass over the top of its sill and adjacent floor surfaces when swinging. When weather events produce prolonged severe storm winds and blowing rains, pivot door assemblies are prone to severe leaking as flexible brush-style weather seals or other gasketing is insufficient to restrain the volume of wind-driven water and wind that can occur as there are no fixed structural stops at either bottom and top edges necessary to create a robust structural seal to prevent water and air infiltration of the assembly. This condition is one of standard pivot doors weakest attributes. In their attempt to address this liability standard pivot door manufacturers sometimes provide containment troughs or sumps directly below door panels to collect water and drain it away with either gravity plumbing or mechanical pumps. Gravity drains may work for a limited amount of water during a short term but can clog or become overwhelmed during significant rain events and mechanical pumps can also clog or quit in a power failure.

Structural containment of door panels within the door jamb assembly is key to withstanding higher velocity wind loads and/or damage from large missile debris impact. Standard hinged doors have been found to fail as a result of high winds and flying debris. In Florida for example, hurricanes have been known to create considerable wind-load conditions that can overcome conventional entry doors, resulting in wind and rain damage to a residence or business premises with extensive repairs to the property, up to and including its complete destruction. As a result, Florida requires testing for impact and wind-pressure as well as water infiltration resistance to qualify exterior door assemblies, and although a few pivot doors have been approved, these only meet minimum standards due to their design limitations.

Performance standards in Pivot door designs have other inherent weaknesses. Since pivot doors inherently rely on single top and bottom spindles that allow door panel rotation on a single axis, any amount of lateral pressure produced by storm-winds to the exposed door face, impact from flying debris or concentrated stresses generated during a forced entry event, are necessarily transferred to the single pivot spindles that must withstand corresponding high-load conditions. Without full structural resistance at the top and bottom edges of standard Pivot door assemblies, door panels rely solely on containment at the single top and bottom by its spindle points. Minimum hurricane design requirements beginning at 75 MPH translate into a wind-loads of 1500 lbs for a 4 foot wide and 10 foot tall pivot door panel. This concentrated point-loading represents a potential weakness in standard pivot door assemblies, especially at the spindle points. The greater the door size the greater the load that is concentrated at these structural points and the greater potential for failure.

Another aspect of standard pivot doors is that to secure them they must incorporate a separate mechanical locking system, whether a simple single latch, latch and deadbolt combination, or robust multipoint locking system, additional locking devices are necessary to restrain pivot door panels in their secure and locked position. The various mechanical locking systems usually require individual manual activation and can require more than one lock at each vertical edge/end. Therefore, any method of pivot door operation eliminating the need for multiple manual locking devices, while providing greater door panel restraint and elimination of mechanical lock service, would be considered an improvement.

While the prior art has addressed some of the problems related to conventional pivot doors, it has failed to provide a specific single solution that combines all the following aspects to include: improved security from unauthorized entry, improved structural strength to resist wind damage, improved aesthetic appeal, improved pest prevention, elimination of auxiliary mechanical locks, improved resistance to flooding caused by water infiltration, all together with one single basic modification.

SUMMARY OF THE INVENTION

This invention provides a pivot door lifting modification that holds pivot door panels firmly in place when lifted and locked that is completely restrained and secured along its full width at both top and bottom edges, structurally sealing out water and air by securing the door panel along both vertical edges, and eliminating the need for additional auxiliary mechanical locking devices. This innovation is produced by means of an internal, mechanically activated lifting component installed in the bottom portion of the door panel that we describe as a retractable lifting foot. When disengaged and retracted, our pivot door freely rotates on its axis, like standard pivoting doors. When the internal locking lifting foot is engaged it extends downward into a fixed sill. While still powered, the lifting foot continues its extension with sufficient force to also lift the door panel upwards, forcing the top of the door into a matching pocket at the door/jamb head. When fully extended both the top and bottom edges of the pivot door panel are completely recessed into weather-sealed corresponding upper and lower pockets, preventing water and air infiltration. Our pivot door axis spindles are contained inside the structural door panel and remain attached to the sill and jamb head, holding it in position ready to go into normal operational pivoting mode when unlocked. With the lifting foot extended the panel is secured along its full width top and bottom and is accomplished by forcing the door panel into a full interlock position. The internal axis spindles are enclosed and concealed at their attachment points along and within the door panels, eliminating exposure to extreme wind-loads or adverse reactions from missile impacts that remains a weakness in current pivot door designs.

Both vertical jamb-legs have structural grade mushroom studs fixed in positions so that they do not obstruct or engage the door when the door panel is in its unlocked and swinging position. When the lifting foot first presses against the bottom sill, then continues its extension, it forces the door panel itself to lift upwards. The vertical ends or edges of the pivot door panel have slotted strikes that correspond to the jamb studs so that when the door panel is lifting into the locked position the studs and strikes align and engage each other when in a full lock extension position. This vertical self-interlocking action eliminates the need for secondary auxiliary locking devices, with only the internal actuator required to raise and lock the door or lower to unlock the door. Additionally, the door is positioned in the jamb assembly with structural stops and weather-stripping on the vertical jamb faces providing additional weather-gasketing to augment water and air filtration prevention.

With the single incorporation of a mechanical lifting foot we are able to achieve the elimination of auxiliary mechanical locking systems, provide full structural top and bottom capture of the door panel to increase its ability to resist missile impacts and higher wind-storm loads, protect axis spindles and resolve spindle point-loading liabilities, allow greater options for spindle positioning in the swing, provide a superior door seal so that containment sumps or troughs to remove water are not necessary, eliminate the need for service and replacement of weather-gasketing seals due to constant abrasion, aesthetically improve appearance for a cleaner contemporary look by eliminating unnecessary hardware, and improve perimeter structural restraint allowing for larger sized high-performance architectural pivot doors.

DETAILED DESCRIPTION OF THE PREFERRED EMBODIMENT

Figure 1A:
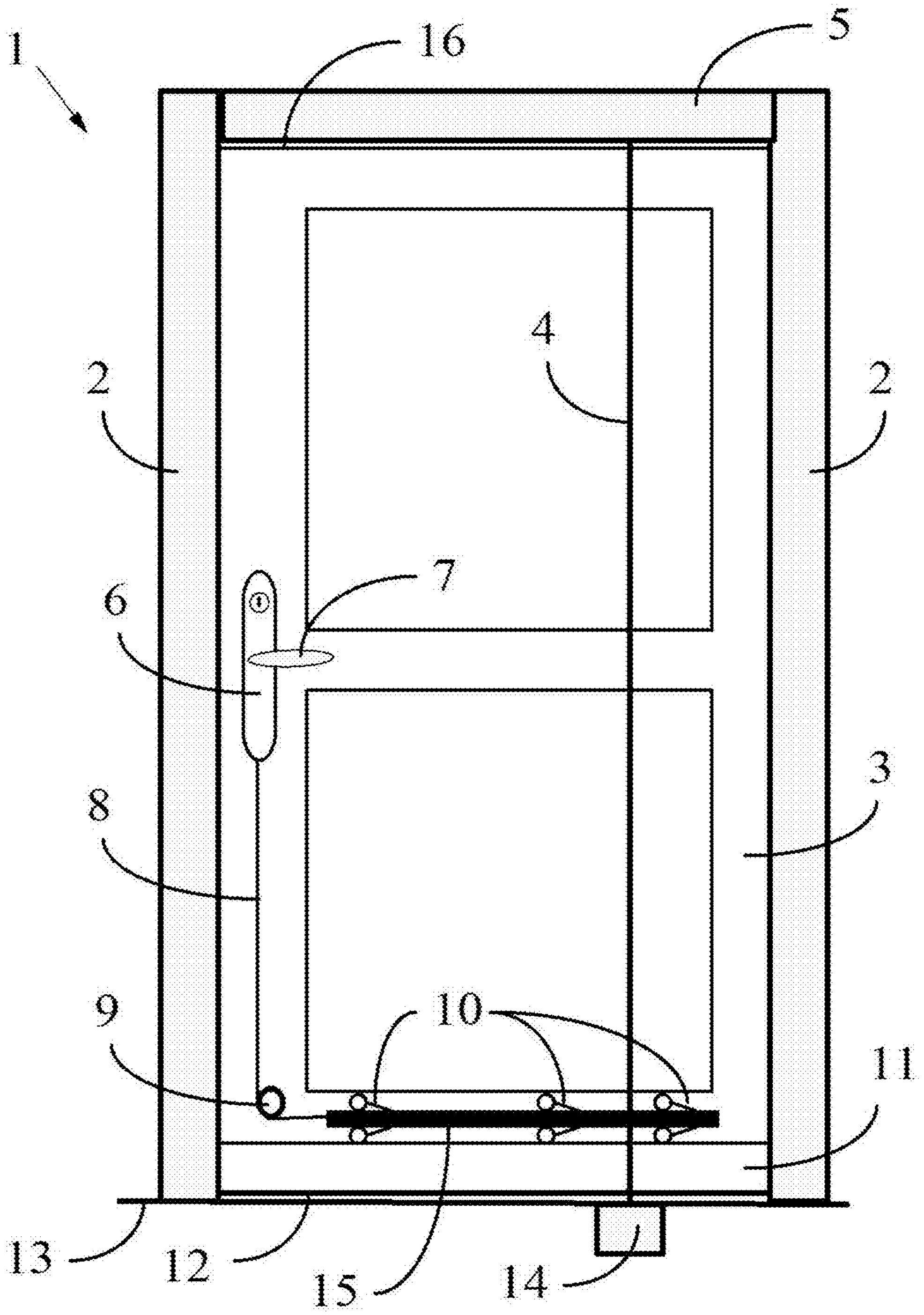
FIG. 1A illustrates a preferred embodiment of a lifting pivot door in the unlocked position.
Figure 1B:
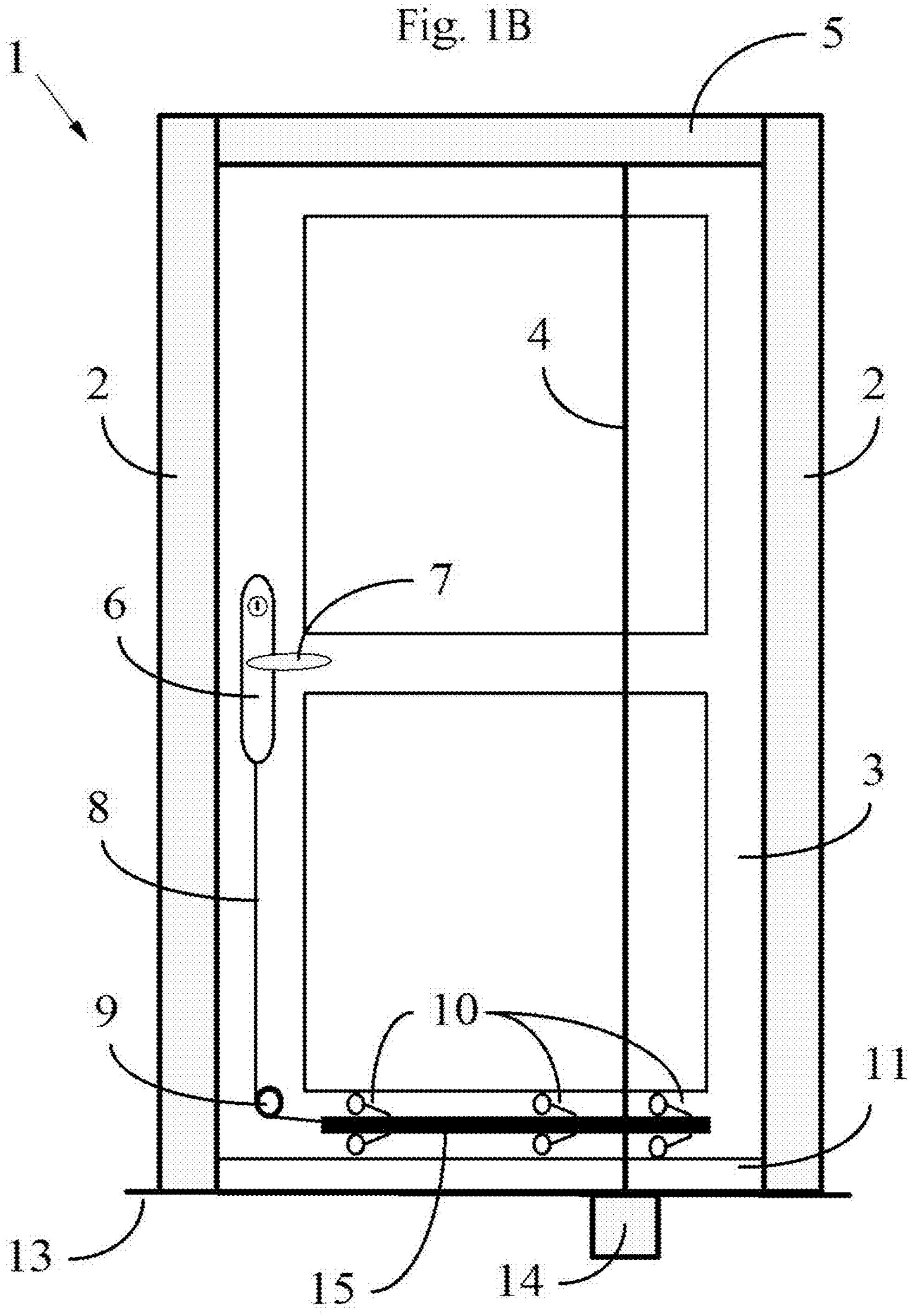
FIG. 1B illustrates a preferred embodiment of a lifting pivot door in the locked position.

Prior to a detailed discussion of the figures, a general overview of the invention is provided.

This invention provides significant improvements over prior art pivot doors. In particular, the pivot door provided by this invention includes the following improvements over prior art pivot doors:

1- The full capture and containment of the doors top and bottom components in the jamb assembly when the lifting foot is engaged.

2- By lifting the doors to engage fixed locking points along the vertical edges of the door panel, the need for conventional locks as well as the elimination of the pivoting spindles to act as the lateral restraining points that structurally support or hold the door in position and would otherwise be the sole means of holding the door in the opening.

3- Sealing the door at the bottom and top from water and air infiltration.

4- Providing greater wind-load and forced entry resistance.

5- Providing greater aesthetic appeal with the possibility to allow the design of larger size doors that meet government design requirements that would otherwise not be possible with standard pivot door designs.

Prior art pivot doors provide none of the foregoing advantages of this invention.

This invention provides a pivot door that is held firmly in place, secured top and bottom, as well as securing the door panel along both vertical edges, thereby sealing out water and air infiltration, as well as biological pests. In addition, the ceiling mechanism used for this invention also benefits conservation of energy in that, by sealing the edges of the door, airflow around the top, bottom, and side edges of the door is eliminated. By reducing the airflow around through the door assembly, differences in temperature between the exterior and interior of the dwelling are less likely affect the set temperature in the dwelling, and thereby reduce energy consumption.

This invention provides a pocketed mechanical raising component (referred to herein as a ‘lifting foot' or “mull”) installed into the lower portion of the door panel that, when activated, extends downward into a fixed receiving sill with sufficient force to also lift the door panel itself upwards. When the door panel is lifted, the top edge of the door is forced into a corresponding jamb pocket in the door head when the door panel is fully lifted into the closed and locked position. When the door is closed and lifted into the locked position, locking pins and corresponding interlock strikes along the vertically aligned edges of both the door panel and jamb assembly engage. The position of these interlocking pins are free when the door panel is in the lower unlocked and swinging position. The top and bottom pivot door spindles on which the door panel rotates also allow the door panel to travel up and down the distance necessary to move into the fully locked and lifted position. When the door panel is lifted into the locked position the full width of the door panel is captured at both the top and bottom edges into corresponding pockets in the lower sill and jamb head. When the full width of the internally pocketed lifting foot extends into the corresponding sill pocket it closes and seals the gap between the bottom of the door panel and sill. As a result, water and or biological pests cannot penetrate under the door.

When the force of the lifting foot is applied and sealed against the sill it forces the door panel upwards. While the door panel moves upwards, locking pins/cams and opposing interlocking strikes positioned along the edge of the door panel and jamb assembly engage along both vertical edges of the door panel in the jamb assembly. Further, in the lifted and locked position the door head is inserted into the full width of the jamb pocket along the width of the door panel. Both the jamb sill and top edge of the door, as well as the vertical sides of the door and jamb have rubberized gasketing installed in such a way to further seal out water and air infiltration. The jamb assembly in the locked and sealed position with the full width and height of the door panel captured and contained in the jamb assembly is structurally designed to be anchored and fastened to the opening at the level necessary to resist high wind-loads and debris impacts.

Both vertical edges of the door panel and jamb assembly are fabricated to allow multiple placement of individual interlocks which can be designed to resist greater loads as required. The capture of the full width top and bottom of the door panel in the jamb assembly, together with the ability to engage the static vertical edge door interlocks when lifting the panel into the locked position provides superior capture of the door in the jamb assembly and negates the need for any other independently operated mechanical locking devices. At the same time, this system offers a greater ability to seal the door in the opening to prevent water, air and insect infiltration as well as reduced vulnerability to events such as forced entry, large missile impacts and high pressure hurricane style wind-loads.

For ease of illustration, the following figures show the cams used by the invention as scissor cams. However, those skilled in the art will recognize that any suitable cam mechanism can be used. For example, the cams can be hydraulic cylinders, pistons or other means that also provide lifting similar action to raise and capture the edges of the door to lock it in place.

When unlocking the door, the lifting foot is mechanically retracted back into its internal pocket which lowers the door panel into the operable swinging position as it is no longer held in the upper locking channel while simultaneously raising the lifting foot back into the door body so that the door can swing freely on the pivot. The pivot spindle can extend vertically into both the top and bottom portions of the door panel, although not necessarily through the complete height/length of the door to allow for the door to be glazed within the panel interior if so desired. However, those skilled in the art will recognize that the spindles at the top and bottom of the door can be replaced by a single spindle rod to that extends through the entire vertical height of the door.

For ease of discussion, the “lifting foot” will be interchangeably referred to as the “lifting foot” or as the “mull bar”

Having discussed the invention in general, we turn now to a detailed discussion of the figures.

FIG. 1A illustrates a transparent view of a preferred embodiment of a lifting pivot door assembly 1. This view shows the door frame 2 on both sides of the door 3. A pivot rod 4 extends inside the door 3 from an anchor 14 to the jamb pocket 5. In the unlocked position, there is a gap 16 between the upper edge of the door 3 and the jamb pocket 5 such that the door 3 can swing freely without interference from jamb pocket 5. Further, in the unlocked position, the mull bar 11 is retracted to allow the door 3 to swing freely. Likewise, there is an additional gap 12 between the bottom of the door 3 and the surface of the floor 13 which also provides clearance to allow the door 3 to swing freely. In the preferred embodiment, the gap 12 between the bottom of the mull bar 11 and the floor surface 13 is approximately ¼ inch. However, those skilled in the art will recognize that this may vary depending on the type of flooring material used.

In the figures, a pivot rod 4 is shown for ease of illustration. However, those skilled in the art will recognize that the pivot rod 4 can easily be replaced with individual spindles at the top and bottom of the door. Further, the use of separate spindles as pivot points allows the door to be designed with any type of material, for example, glass.

Also shown in this figure is the door handle assembly 6, and the door handle 7. The door handle 7 is connected to cable 8 which extends around roller 9 to the cam assembly 10. When the handle 7 is turned, it pulls the cable 8 and moves cam assembly bar 15 to activate the cam assembly 10 to move the door 3 from the unlocked to the locked position by raising the door 3 into the pocket in the header of the door jamb 5. Simultaneously, the cam assembly 10 forces the mull bar 11 downward into contact with the floor 13. At that point, the bottom of the door 3 is sealed at the bottom to prevent access via water or pests and the top of the door 3 is secured by the locking channel 5 in the header of the door jamb 5. In a preferred embodiment, a sill 19 (shown below in FIGS. 3A-B) is used at the bottom of the door entry such that when the mull bar 11 is pressed down, it enters the sill 18 and seals the bottom of the door 3 to the floor 13.

Figure 2A:
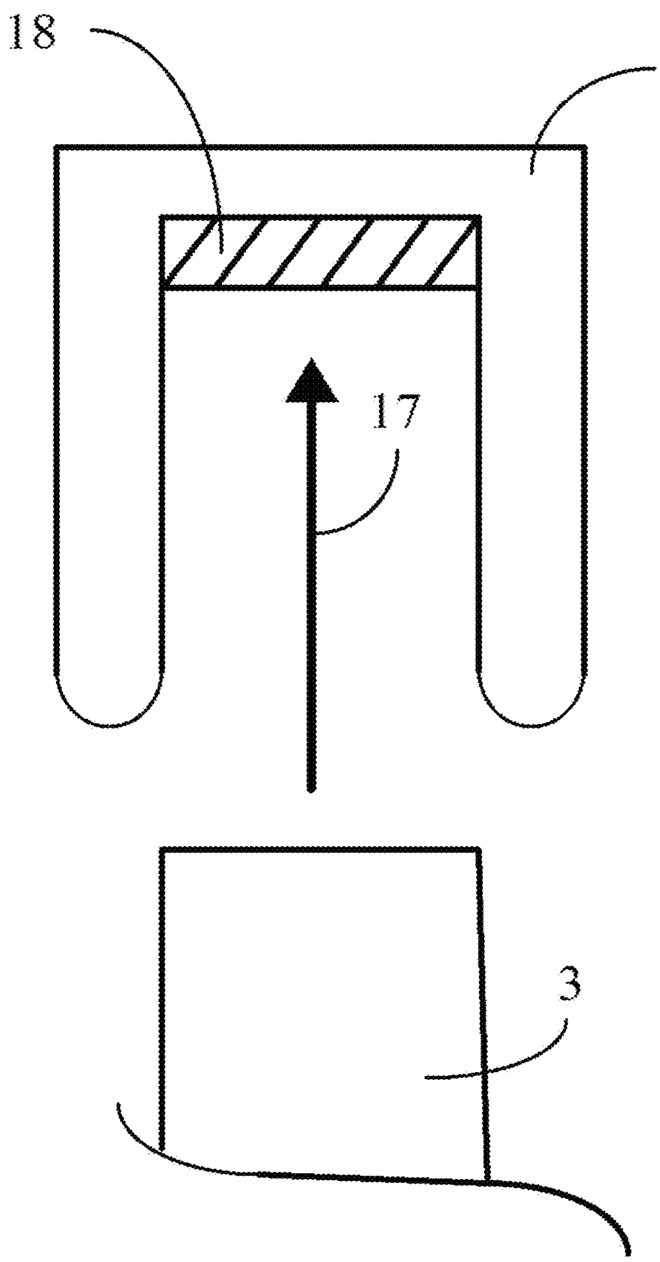
FIG. 2A illustrates an edge view of the lifting pivot door in the unlocked position prior to engagement with the jamb pocket.

FIG. 2A illustrates an edge view of the door 3 in the unlocked position prior to engagement with the locking channel 5. Arrow 17 indicates the direction the door takes when it is moved into the locked position. Also shown in this figure is upper pliant layer 18 which is positioned on the inside surface of a pocket in a header of the door jamb 5. The upper pliant layer 18 can be fabricated from any suitable pliant or rubberized material that allows the top of the door 3 to be compressed against the upper pliant layer 18 when the door 3 is in the locked position.

Figure 2B:
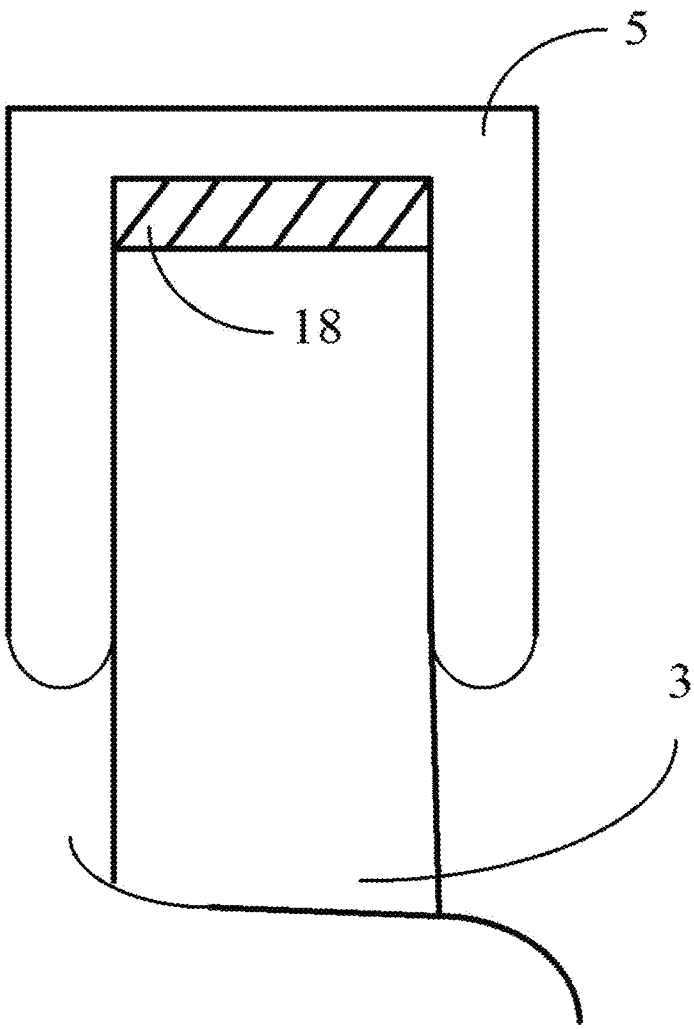
FIG. 2B illustrates an edge view of the lifting pivot door in the locked position when engaged with the jamb pocket.

FIG. 2B illustrates an edge view of the door 3 in the locked position when engaged with the locking channel 5. Once the door 3 is engaged with pocket in a header of the door jamb 5, it is prevented from moving. As a result, the door is held securely in place. Also shown in this figure is upper pliant layer 18 which is positioned on the inside surface of the jamb pocket 5. As a result, the pliant layer 18 and the mull 11 create airtight seals at the top and bottom of the door 3 to prevent water and pests from entering, and to also prevent air flow into the dwelling.

In addition to the foregoing, the lifting pivot door assembly 1 also provides improved aesthetics because it does not use unsightly hinges which detract from the appearance of the door 3. At the same time, the absence of hinges improve security by eliminating a weak spot that an intruder might exploit.

Both the door 3 and the internal components can be fabricated from any suitable material to achieve a desired aesthetic or functional goal.

When in the locked position, the mull bar 11 prevents water and/or pests from gaining access to the building by traveling under the door 1. Further, since the door 3 is now held securely in place by the pocket in the header of the door jamb 5, and the mull bar 11, the door 3 is highly resistant to wind damage.

Figure 3A:
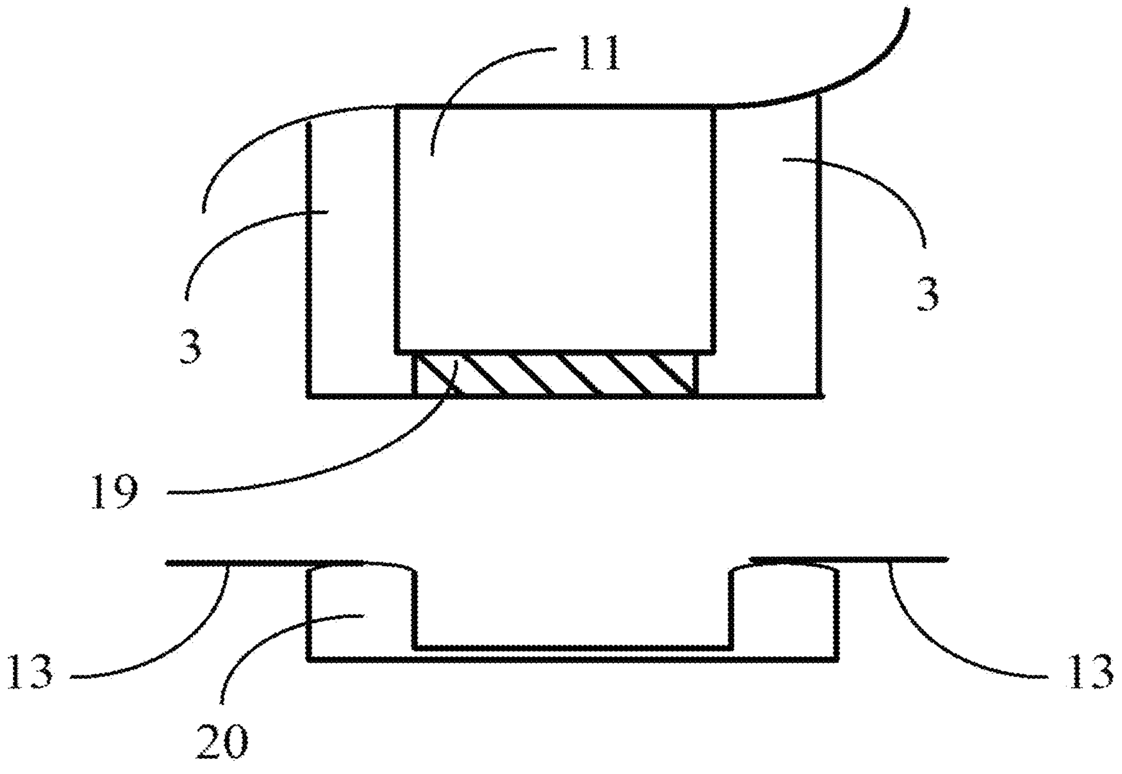
FIG. 3A illustrates an edge view of the bottom of the lifting pivot door in the unlocked position prior to engagement of the mull with the sill.

FIG. 3A is a cutaway edge view of the lower end of the door 3 prior to engagement with the sill 20. As seen in this figure, the mull bar 11 is retracted into the door 3. When the mull bar 11 is retracted, the door 3 can swing freely without interacting with the sill 20. In the preferred embodiment, the sill 20 is embedded in the floor such that it does not extend above the surface of the floor. Also shown in this figure is lower pliant layer 19 which is sized to fit within sill 20.

Figure 3B:
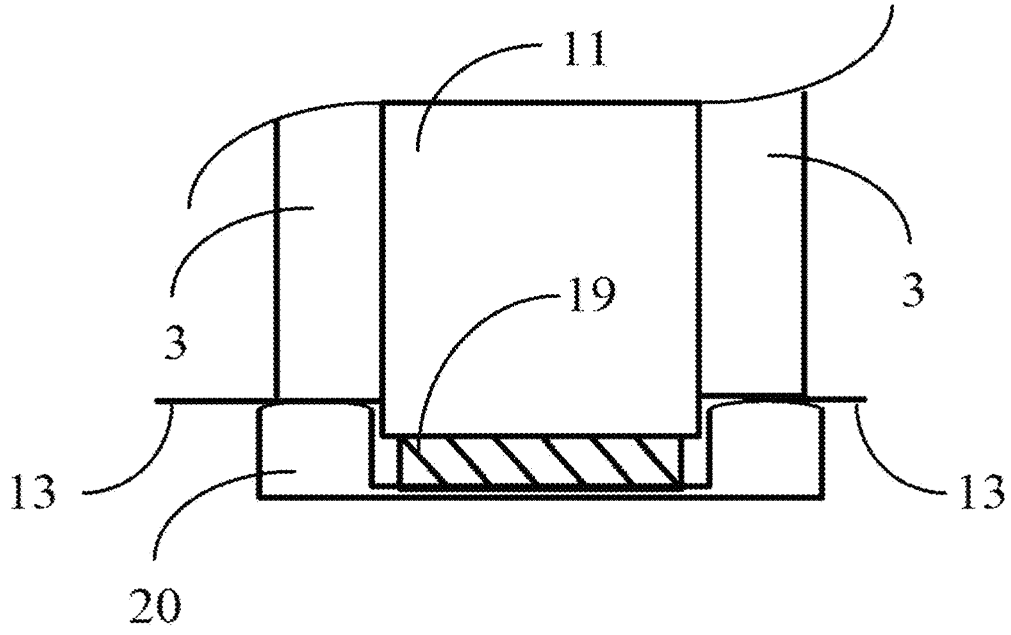
FIG. 3B illustrates an edge view of the bottom of the lifting pivot door in the locked position when the mull is engaged with the sill.

FIG. 3B is a cutaway edge view of the lower end of the door 3 after engagement with the sill 20. As seen in this figure, the mull bar 11 is extended into the sill 20. When the mull bar 11 is extended, the door 3 is locked in place with the sill 20. Also shown in this figure is lower pliant layer 19 which is sized to fit within sill 20 and is compressed against sill 20 and forms a seal that prevents water and pests from entering.

This discussed above, the invention provides pliant layers 18-19 on the top and bottom of door 3 that prevent wind, water and pests from accessing a building through the door assembly 1.

Figure 4A:
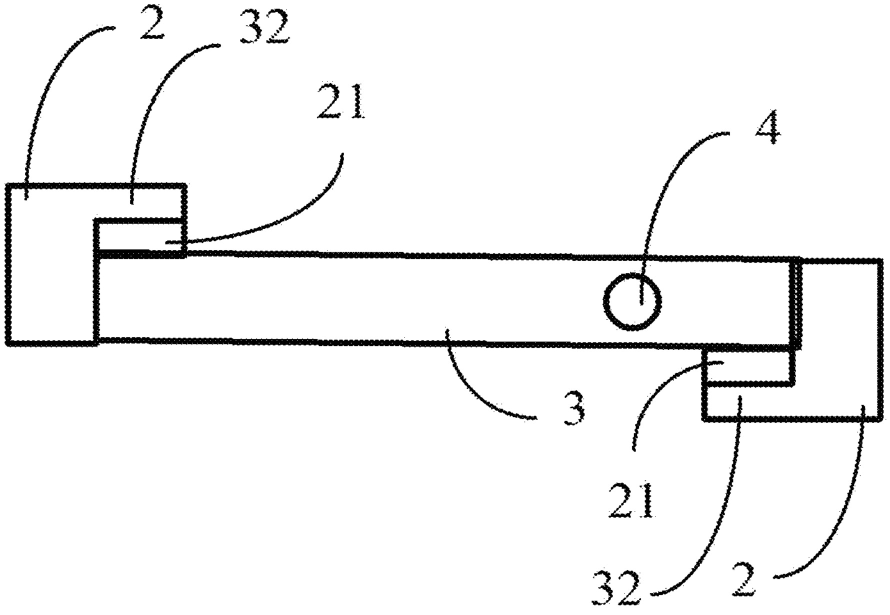
FIG. 4A illustrates a top view of the lifting pivot door in the locked position with pliant seals on both sides of the door.
Figure 4B:
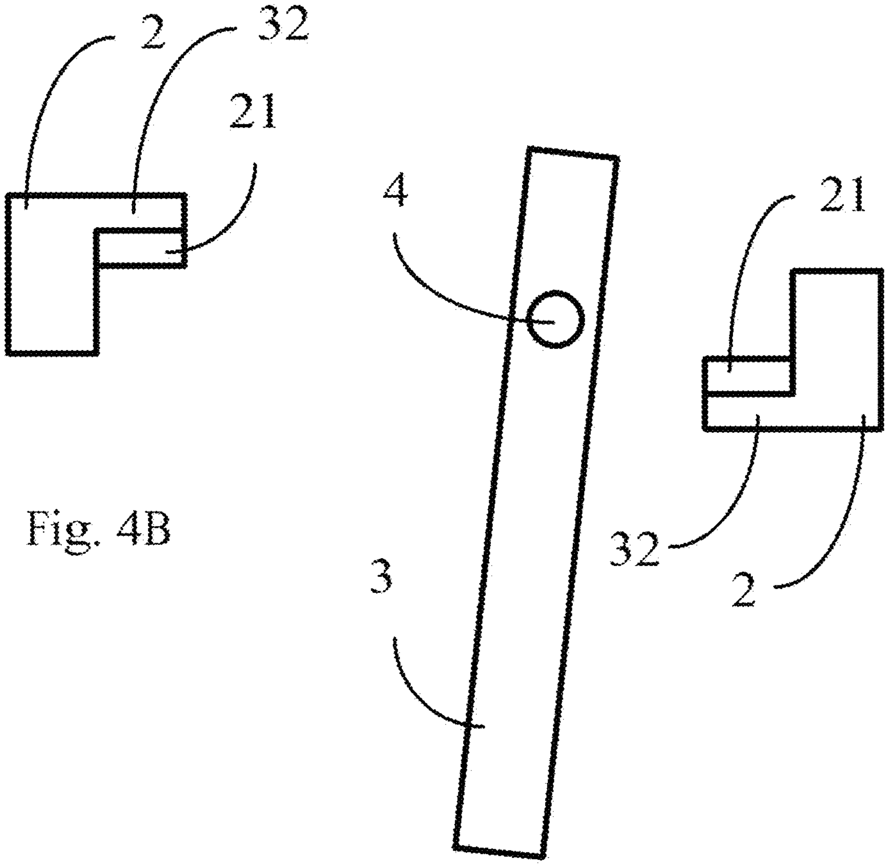
FIG. 4B illustrates a top view of the lifting pivot door in the unlocked position with pliant seals on both sides of the door frame.
Figure 4C:
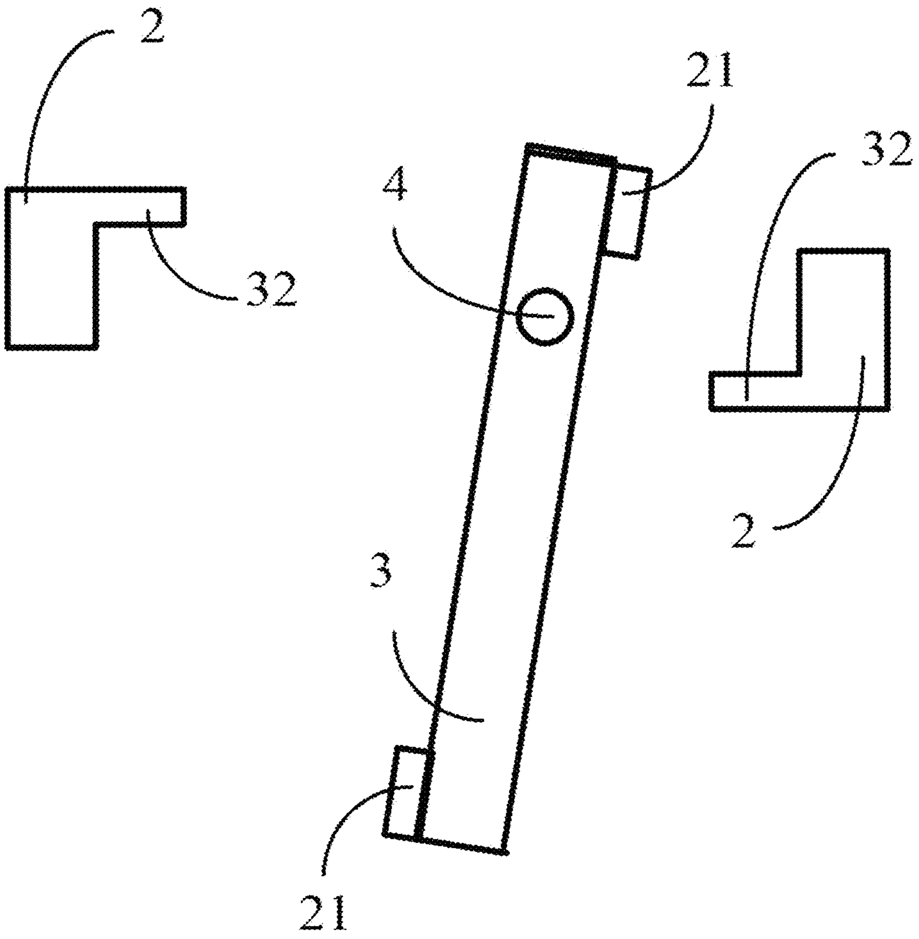
FIG. 4C illustrates a top view of the lifting pivot door in the unlocked position with pliant seals attached to the door instead of the door frame.

In addition, edge seals 21 can also be secured to the door frame 2 or to the door 3 itself such that the door assembly 1 is sealed on both vertical sides. As shown in FIG. 4A the door 3 is shown in the locked position. Side Extensions 32 are also illustrated in FIGS. 4A through 4C. Side extensions 32 provide a support surface for edge seals 21. When the door 3 is in the locked position, it presses against pliant side seals 21, thereby preventing any airflow around the vertical edges of the door. Those skilled in the art will recognize that location of the seals 21 will vary depending on whether the door 3 opens outward or inward.

FIG. 4B illustrates the same door 3 in the unlocked and open position. In FIGS. 4A-B, the seals 21 are illustrated as being attached to the frame 2. However, the seals 21 can easily be placed on the side edges of door 3 instead of frame 2.

FIG. 4C illustrates an alternative preferred embodiment in which the seals 21 are illustrated as being attached to the door 3 instead of the frame 2.

Figure 5A:
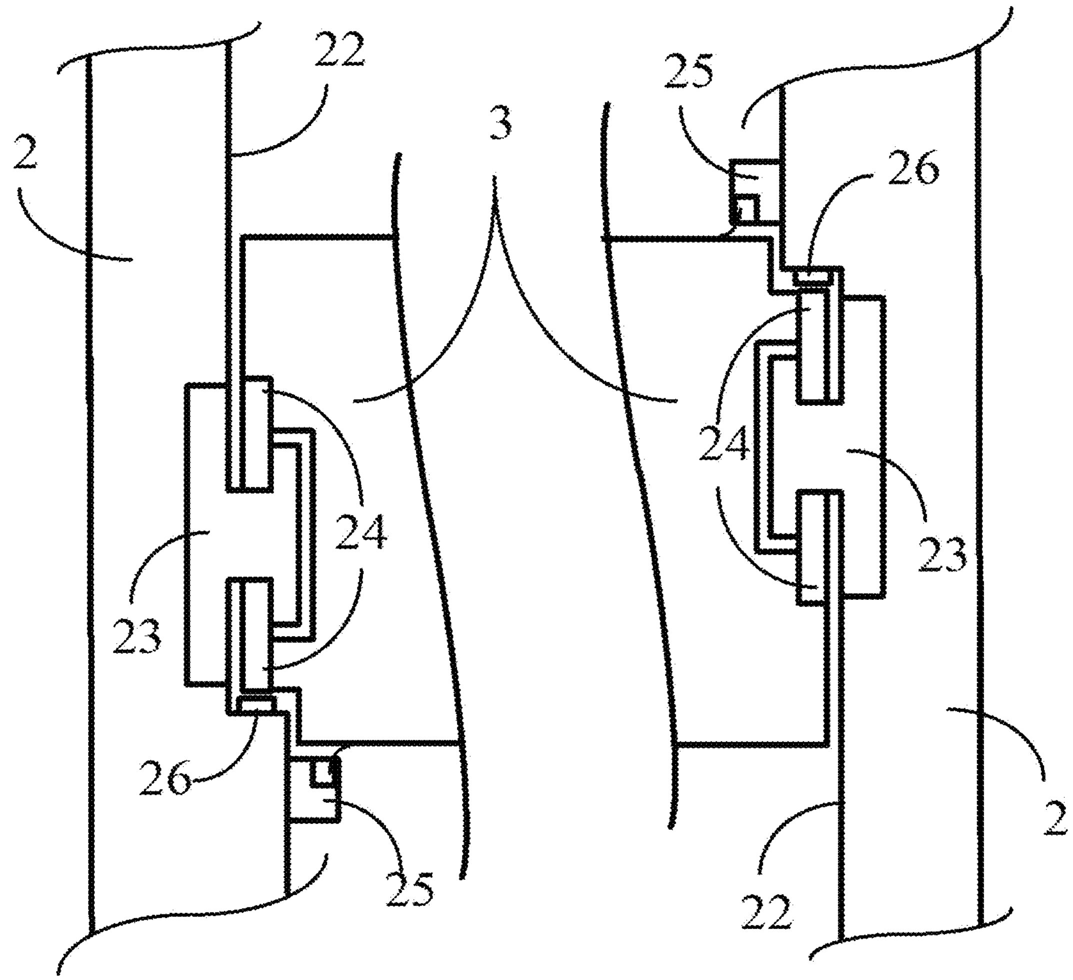
FIG. 5A illustrates a top view of a mushroom stud and a slotted strike in the locked position.

In FIG. 5A, a vertical top view is shown in the locked position. In this view frame 2 has vertical jamb sides 22 on opposing sides of the door assembly 1. Each jamb side 22 has structural grade mushroom studs 23 fixed in positions so that they do not obstruct or engage the door when the door panel is in its unlocked and swinging position. In the preferred embodiment, the mushroom studs 23 are embedded into the jamb sides 22 and secured via screws (not shown). When the mull bar 11 presses against the bottom sill 20, it forces the door 3 to lift upward.

The side edges of the door 3 have slotted strikes 24 that correspond to the mushroom studs 23 so that when the door 3 is lifted into the locked position, the mushroom studs 23 and slotted strikes 24 align and engage each other in a full lock extension position as shown. This vertical self-interlocking action eliminates the need for secondary auxiliary locking devices, with only the internal actuator required to raise and lock the door 3 or lower to unlock the door 3. Additionally, door 3 is positioned in the jamb 2 with structural stops 25 and weather-stripping 26 on the vertical jamb sides 22 providing additional weather-gasketing to augment water and air filtration prevention. When locked, mull bar 11 forces door 3 to move upward such that it is sealed top and bottom in the sill 20 and the jamb pocket 6. When door 3 is raised by mull bar 11, the slotted strikes 24 move upward along path 27 and engage the mushroom studs 23 to secure the door 3 to the jamb 2. As a result, door 3 is sealed around its entire periphery.

Figure 5B:
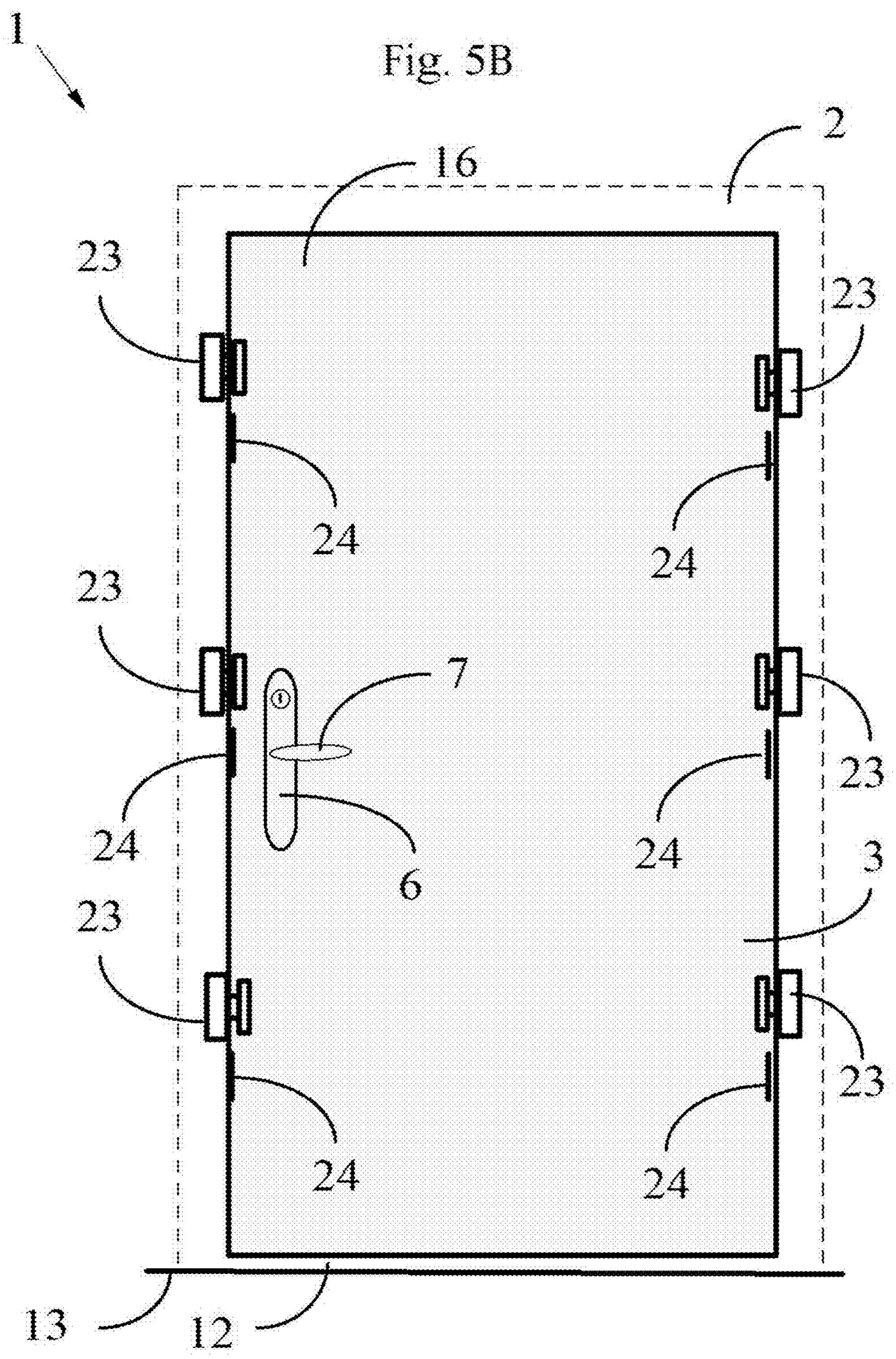
FIG. 5B illustrates a front view of a pivot door in the unlocked position.

In FIG. 5B, the door 3 is illustrated in the unlocked position. When unlocked, the mushroom studs 23 in the jamb 2 and the slotted strikes 24 are not engaged and do not prevent the door 3 from pivoting. For ease of illustration, three mushroom studs 23 and three slotted strikes 24 are shown on opposite vertical sides of the door 3. However, those skilled in the art will recognize that the number of mushroom studs 23 and slotted strikes 24 will vary depending on the size of the door 3, its weight, etc.

When in the unlocked position, mull bar 11 is retracted. As a result, door 3 is lowered such that it is not engaged with jamb pocket 6 or sill 20. Likewise, the slotted strikes 24 on the side edges of door 3 are not engaged with the mushroom studs 23 on the frame 2. As a result, the door 3 can pivot freely without interference from the jamb pocket 6, sill 20, or the mushroom studs 23 and slotted strikes 24.

Figure 6A:
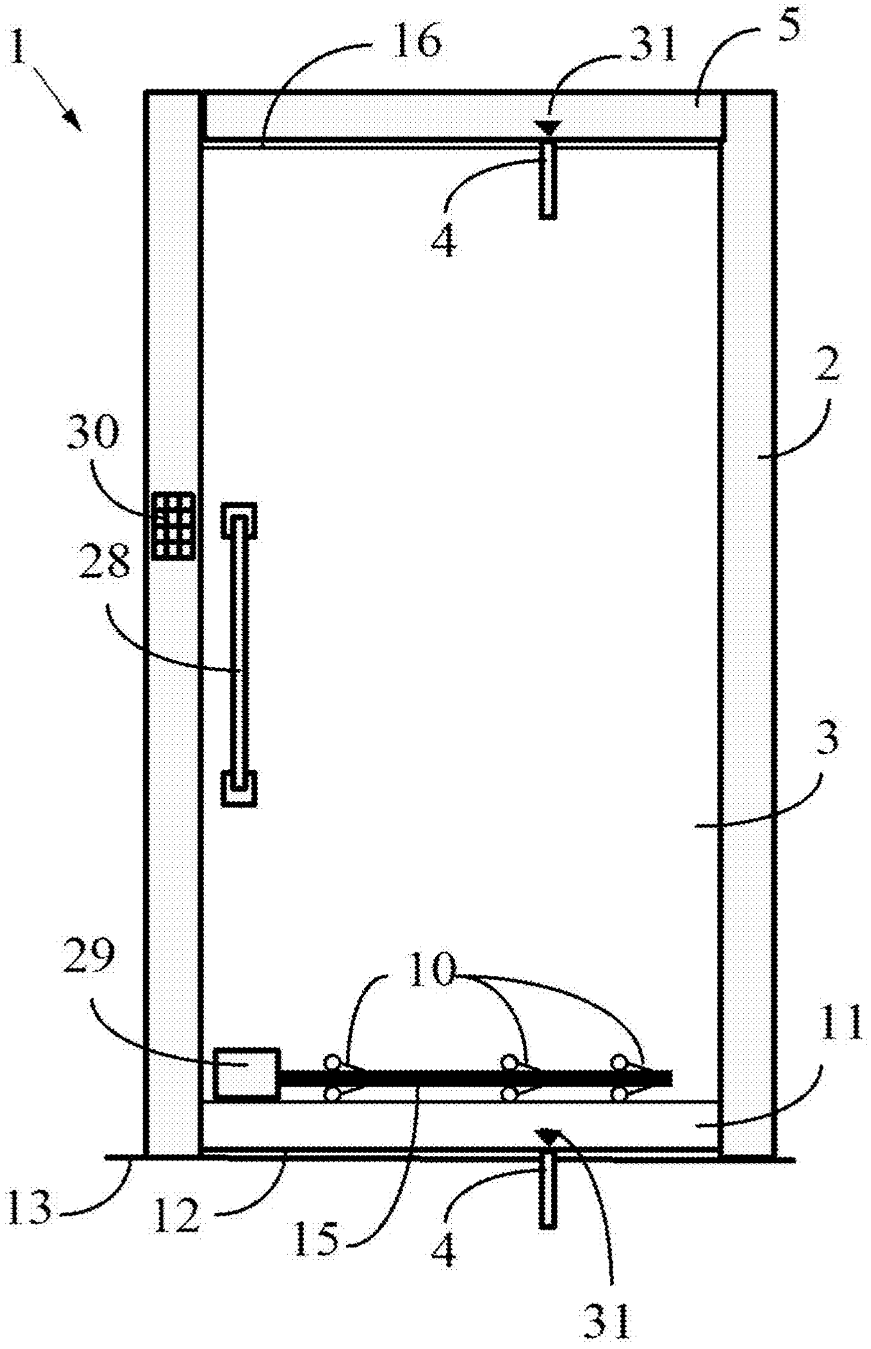
FIG. 6A illustrates an alternative preferred embodiment in which a powered lift mechanism is used to raise the pivot door in place of the mechanical lift shown in previous embodiments. In this figure the door is shown in the unlocked position. In addition, this embodiment uses a keypad which eliminates the need for locking mechanisms such as keys.

FIG. 6A is an alternative preferred embodiment in which a powered lift mechanism 29 is used in place of the mechanical lift shown in FIGS. 1-5. In FIG. 6A, door 3 is shown in the unlocked position. When in the unlocked position, the lifting foot 11 is retracted. As a result, door 3 is not engaged with jamb pocket 6 or sill 20. Likewise, the slotted strikes 24 on the side edges of door 3 are not engaged with the mushroom studs 23 on the frame 2, As a result, the door 3 can freely pivot without interference from the jamb pocket 6, sill 20, or the mushroom studs and slotted strikes 24.

Figure 6B:
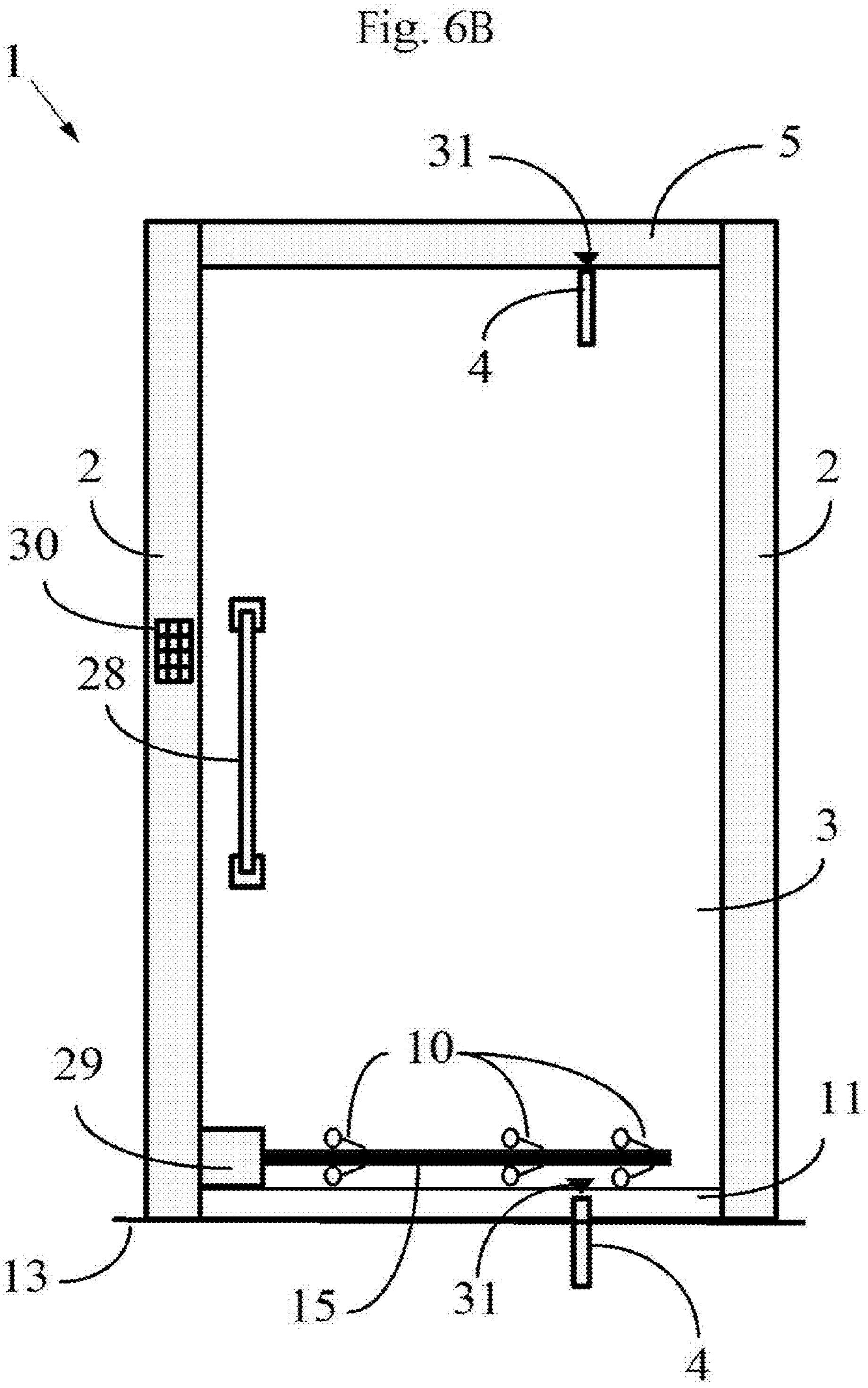
FIG. 6B illustrates the alternative preferred embodiment of FIG. 6A in the unlocked position. In this figure, the door is shown in the unlocked position. The keypad in FIG. 6A is also shown.

FIG. 6B illustrates a front view of the alternative pivot door in the locked position. When locked, the lifting foot 11 forced the door 3 to move such that it is sealed top and bottom in the sill 20 and the jamb pocket 6. Further, when the door 3 is raised by the lifting foot 11, the slotted strikes 24 move upward along path 27 and engage the mushroom studs 23 to secure door 3 to jamb 2. As a result, door 3 is sealed around its entire periphery.

Also shown in FIGS. 6A-B is keypad 30 which eliminates the need for locking mechanisms such as keys. In this preferred embodiment, the keypad communicates with electrical device 29 to move door 3 between the locked and unlocked position. The keypad 30 communicates with electrical device 29 using Bluetooth or any other suitable wireless communication technology.

As can be seen, the invention provides an effective way to prevent damage to a dwelling in inclement weather, as well as providing protection from invasive pests such as insects. It also provides enhanced security and improves energy conservation by reducing air flow between the exterior of the building in the interior of the building.

While specific embodiments have been discussed to illustrate the invention, it will be understood by those skilled in the art that variations in the embodiments can be made without departing from the spirit of the invention. The types of materials used can vary, the method of attachment can vary, a single pivot rod can be used in place of individual spindles at the top and bottom of the door, etc. Therefore, the invention shall be limited solely to the scope of the claims.

I claim:

1. A lifting pivot door, comprising:

a door panel, the door panel further comprising:

a pivot extending from a top end of the door panel and a bottom end of the door panel, the pivot offset from vertical edges of the door panel such that the door panel can be opened or closed on the pivot without use of a door hinge; and a lifting foot inside the door panel that retracts into the door panel when deactivated to allow the door panel to swing freely, and when activated, extends downward into a sill in the floor beneath the door panel, the lifting foot further pushing the door panel upward into a header in a door frame that forms a pocket such that the bottom end of the door panel is secured in the sill and the top end of the door panel is secured in the pocket in the door frame jamb and the door panel is prevented from swinging freely;

a door jamb, wherein the door jamb further comprises:

first and second vertical door jambs;

a first extension on a side of the first vertical door jamb, the extension extending outward from the first vertical door jamb such that when the door panel is in the closed position, the door panel rests against the first extension, and;

a second extension on a side of the second vertical door jamb, the second extension extending outward from the second vertical door jamb such that when the door panel is in the closed position, the door panel rests against the second extension; and the header extends downward from the door frame to form the pocket in the door frame jamb that is sized to accept the door panel;

a battery inside the door panel;

a motor operatively connected to the battery and the lifting foot, the motor controlling movement of the lifting foot from extended to retracted positions and powered by the battery; and a door handle, keypad or wireless control, operatively connected to the motor such that when the door handle, keypad or wireless control activates the motor, the lifting foot is selectively moved between the retracted or extended positions;

a cam assembly housed inside the door panel and near the bottom end of the door panel that is operatively connected to the lifting foot such that when the motor extends the lifting foot, the cam assembly extends the lifting foot into the sill and further lifts the door panel into the pocket, and when the motor retracts the lifting foot, the cam assembly retracts the lifting foot from the sill and lowers the door panel out of the pocket.

* * * * *